(12) United States Patent
Huang et al.

(10) Patent No.: US 10,869,200 B1
(45) Date of Patent: Dec. 15, 2020

(54) HYBRID DYNAMIC SPECTRUM ACCESS OF HIERARCHICAL HETEROGENEOUS NETWORKS WITH NO SINGLE POINT OF FAILURE

(71) Applicant: Rockwell Collins, Inc., Cedar Rapids, IA (US)

(72) Inventors: Sherry Huang, Plano, TX (US); George F. Elmasry, San Marcos, CA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/735,877

(22) Filed: Jan. 7, 2020

(51) Int. Cl.
  *H04W 28/16* (2009.01)
  *H04W 16/06* (2009.01)
  *H04W 88/16* (2009.01)
  *H04W 84/18* (2009.01)

(52) U.S. Cl.
  CPC ........... *H04W 16/06* (2013.01); *H04W 28/16* (2013.01); *H04W 84/18* (2013.01); *H04W 88/16* (2013.01)

(58) Field of Classification Search
  CPC ..... H04W 16/06; H04W 28/16; H04W 88/16; H04W 84/18
  See application file for complete search history.

(56) References Cited

U.S. PATENT DOCUMENTS

| 6,411,815 | B1* | 6/2002 | Balasuriya | ............ | H04W 84/08 455/512 |
|---|---|---|---|---|---|
| 8,644,290 | B2 | 2/2014 | Chou et al. | | |
| 9,237,043 | B1 | 1/2016 | Beals et al. | | |
| 2008/0112428 | A1 | 5/2008 | Seidel | | |
| 2009/0016262 | A1* | 1/2009 | Kulkarni | ............... | H04W 24/08 370/328 |
| 2011/0117852 | A1 | 5/2011 | Copeland et al. | | |
| 2018/0077208 | A1* | 3/2018 | Li | ........................... | H04W 4/10 |

FOREIGN PATENT DOCUMENTS

| GB | 2461724 B | 1/2010 |
|---|---|---|
| IN | 4777KOLNP2010 A | 2/2011 |

OTHER PUBLICATIONS

Ali, Amjad et al., "Routing Techniques in Cognitive Radio Networks: A Survey", International Journal of Wireless & Mobile Networks (IJWMN), vol. 3, No. 3, Jun. 2011, pp. 96-110.

Hashem, Mohammed et al., "A tree routing protocol for cognitive radio network", Egyptian Informatics Journal 18 (2017) pp. 95-103.

* cited by examiner

*Primary Examiner* — Joseph E Dean, Jr.
(74) *Attorney, Agent, or Firm* — Suiter Swantz pc llo

(57) ABSTRACT

A method and system for implementing dynamic spectrum access (DSA) in heterogeneous hierarchical mobile ad-hoc networks (MANET) as a cloud service, independent of the network connectivity where DSA decisions can be made at any time regardless of the reachability state, includes hierarchical decision making processes and rules implementable at the node level, gateway level, or arbitrator level. The method and system have different precedence levels for making DSA decisions based on connectivity status. The system propagates spectrum sensing information upward, and propagates rule sets, policies and configuration parameters downward in order to create autonomous DSA decisions.

15 Claims, 9 Drawing Sheets

CENTRAL ARBITRATOR COGNITIVE
ENGINE BASED SYSTEM

GATEWAY PROPAGATE FUSED
INFORMATION TO CENTRAL
ARBITRATOR AND PEER
GATEWAYS THREAD

HYBRID DYNAMIC SPECTRUM ACCESS OF HIERARCHICAL HETEROGENEOUS NETWORKS WITH NO SINGLE POINT OF FAILURE

BACKGROUND

Dynamic networks, such as mobile ad-hoc networks (MANETs), utilize spectrum resources in a dynamic manner with frequencies shared and reused autonomously between different systems and between networks from the same system that are geographically separated. Commercial technologies such as 5G include various methods of dynamic spectrum management while sharing of spectrum resources between different systems means that military communication networks can share the same spectrum as commercial networks.

Commercial networks often have a fixed infrastructure except for dynamic deployment of small footprint 5G cells, while military networks are often MANETs with no fixed infrastructure. Commercial networks have developed hierarchical dynamic spectrum management methods for implementing dynamic spectrum access (DSA) based on the fixed infrastructure. Such methods cannot be applied to military networks because of the dynamic features MANETs and because of requirements such as avoiding a single point of failure.

SUMMARY

In one aspect, embodiments of the inventive concepts disclosed herein are directed to systems and methods for implementing dynamic spectrum access (DSA) for large scale hierarchical and heterogeneous networks, and specifically mobile ad-hoc networks (MANETs) where no single point of failure can be tolerated. Spectrum sensing information from each node and from outside the network is incorporated at different hierarchical levels within the network and/or between hierarchical networks. Rules and policies are disseminated from a central arbitrator at the top of the hierarchy of networks down to the individual node level for autonomous DSA decisions. Propagating spectrum sensing information and policy automation rules allows DSA decisions to be made regardless of the network condition.

In an additional aspect, a method for autonomous DSA decisions relies on the presence of cognitive engines at the different hierarchical levels of the MANETs.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
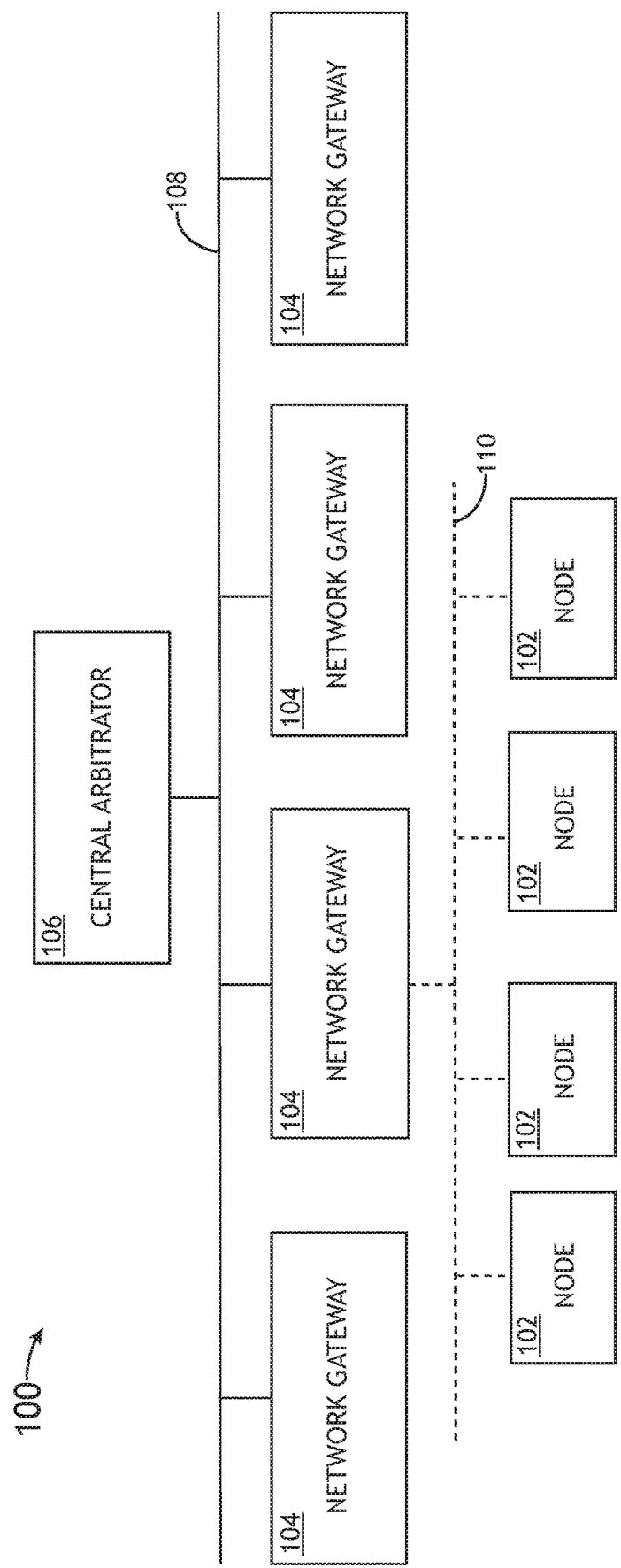
FIG. 1 shows a hierarchical heterogeneous network environment suitable for implementing exemplary embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for implementing dynamic spectrum access (DSA) for large scale hierarchical and heterogeneous networks, and specifically mobile ad-hoc networks (MANETs) where no single point of failure can be tolerated. Spectrum sensing information from each node and from outside the network is incorporated at different hierarchical levels within the network and/or between hierarchical networks. Rules and policies are disseminated from a central arbitrator at the top of the hierarchy of networks down to the individual node level for autonomous DSA decisions. Propagating spectrum sensing information and policy automation rules allows DSA decisions to be made regardless of the network condition.

Referring to FIG. 1, a hierarchical heterogeneous network environment suitable for implementing exemplary embodiments of the present disclosure is shown. The network 100 is a hierarchical heterogeneous network with a central arbitrator 106 at the highest hierarchical point where network management utilities are used. DSA decision making points may be at a node 102 in a network, a gateway node 104, or the central arbitrator 106. In at least one embodiment, DSA decision making may also be a cooperative distributed process.

In at least one embodiment, the central arbitrator 100 is connected to one or more gateway nodes 104 via a first control plane 108. Likewise, each gateway node 104 may be connected to one or more nodes 102 via a second control plane 110. Each of the DSA decision making entities 102, 104, 106 may be operated according to a particular policy automation rule set, either specific to the entity 102, 104, 106, or to the hierarchical level of the entity 102, 104, 106. For example, gateway nodes 104 may be operated in control of, and in communication with nodes 102 using one automation rule set. In at least one embodiment, the gateway nodes 104 may operate in a cooperative distributed manner with other gateway nodes 104 using another rule set for cooperative distributed decisions. The same network gateway node 104 may overrule its local rule set and communicate with the central arbitrator 106 for more accurate DSA decision.

In at least one embodiment, each node 102 may include a rule set for making autonomous DSA decisions, or a distributed cooperative rule set for distributed cooperative decision making with peer nodes 102 through the second control plane 110. In at least one embodiment, a rule set may be an initial configuration (preset) or delta change of the preset where deltas are decided by the central arbitrator 106 and propagated down through the gateway nodes 104 and/or to the nodes 102. Such delta change rule sets are based on spectrum sensing information fusion at all the network hierarchical levels and may happen at any time. In at least one embodiment, preset rules may be specifically defined with respect to specific mission parameters and enabled prior to mission deployment. Preset rule sets can change and can be initiated by the central arbitrator 106.

In at least one embodiment, rule sets can be changed from the central arbitrator 106 based on an analysis of the entire theater, spectrum situational awareness, and/or external entities that create spectrum awareness. Rule sets allow for flexibility in making DSA decisions, but real-time spectrum sensing information fused and propagated through the hierarchy allows for adaptation of DSA decisions based on both rule sets and spectrum sensing information.

In at least one embodiment, DSA decision making is a cloud service that is always available regardless of connectivity. While only three levels of hierarchy are shown, conceived networks 100 may include different levels of hierarchy.

It may be appreciated that in some embodiments, the central arbitrator 106 may designate one or more gateway nodes 104, and the gateway nodes 104 may designate one or more nodes 102, for sensing and aggregating theatre network information, and propagating such information upstream. The aggregated information may be incorporated at each upstream checkpoint (central arbitrator 106 or gateway node 104). Subsequently, such incorporated information may be propagated downstream.

Figure 2:
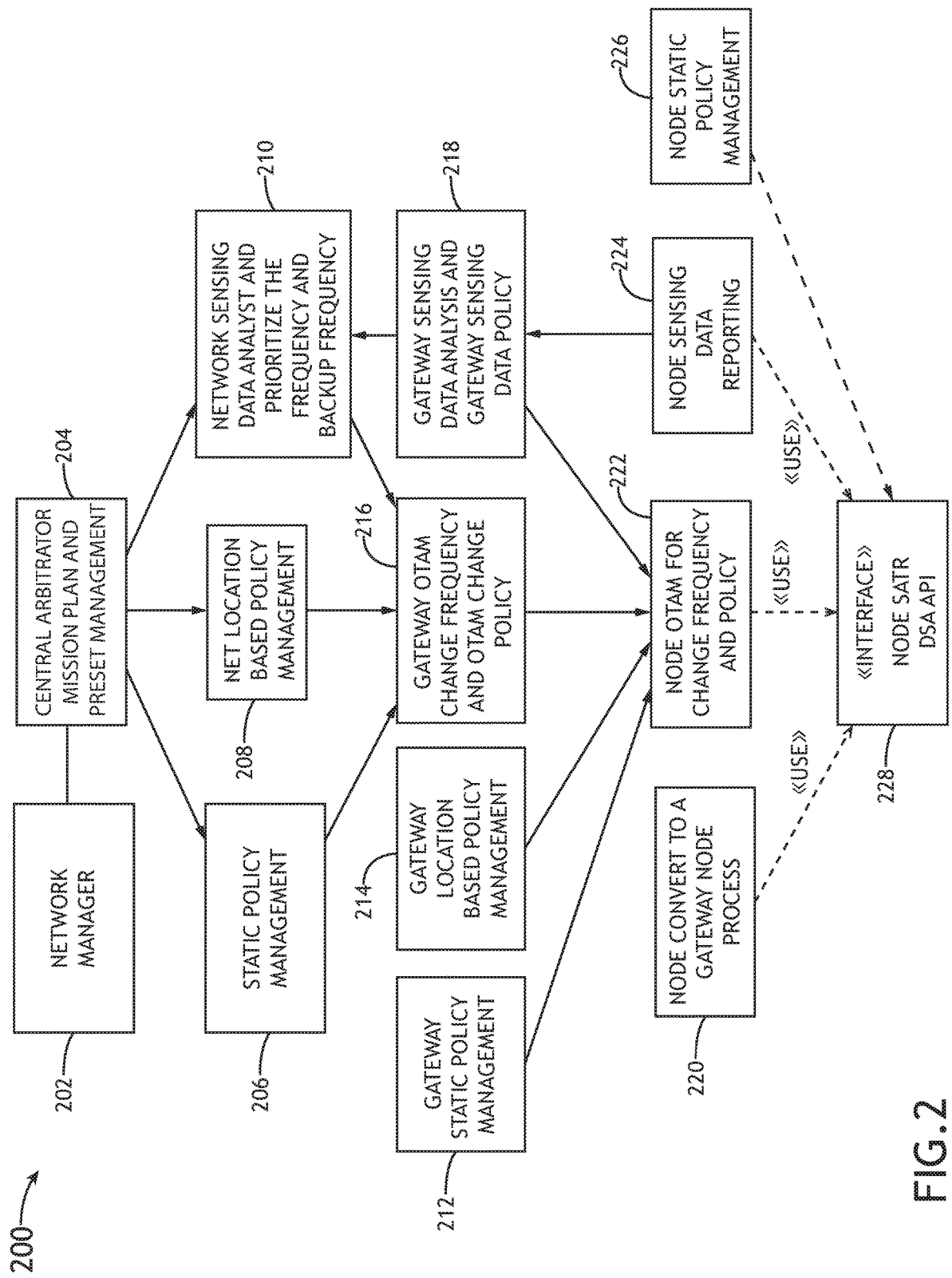
FIG. 2 shows a block diagram of policy management components in a hieratical DSA architecture according to an exemplary embodiment.

Referring to FIG. 2, a block diagram of a policy management system 200 in a hieratical DSA architecture according to an exemplary embodiment is shown. The system 200 includes a network manager 202 in data communication with a central arbitrator 204. The central arbitrator 204 receives mission and theatre specific DSA rule sets for dissemination.

The central arbitrator 204 defines rules for static policy management 206 and rules for network location-based policy management 208. The central arbitrator 204 may also define a network sensing data analysis module 210 for receiving network state data and prioritizing certain frequencies and backup frequencies.

The system 200 also includes gateway level components 212, 214, 216, 218. In at least one embedment, the system 200 defines rules for gateway static policy management 212 and rules for gateway location-based policy management module 214. The system 200 may also include a gateway over-the-air-monitor 216 receives DSA decisions from the static policy management module 206 and/or net location-based policy management module 208, and network state data and frequency prioritization data from the central arbitrator 204 via the network sensing data analysis module 210. The system 200 may also include a gateway sensing data analysis module 218 for receiving state data downstream from the gateway. Each gateway level component 212, 214, 216, 218 is embodied in a gateway node.

In at least one embodiment, the system 200 includes node level components 220, 222, 224, 226. In at least one embodiment, the system 200 includes a node converter process 220 for analyzing a local network configuration and converting a node to a gateway node. The system 200 may also include a node over-the-air-monitor 222 that receives DSA decisions from the gateway static policy management module 212, a gateway location-based policy management module 214, and/or DSA decisions and policies from a gateway over-the-air-monitor 216. In at least one embodiment, a node sensing and reporting module 224 sends local node data to the gateway sensing data analysis module 218. Furthermore, a node static policy management module 226 for embodying node level DSA policy rules.

In at least one embodiment, a node interface module 228 allows node level access to the node converter process 220, the node over-the-air-monitor 222, the node sensing ad reporting module 224, and the node static policy management module 226. Each node level component 220, 222, 224, 226, and the node interface module 228 are embodied in a node.

Figure 3:
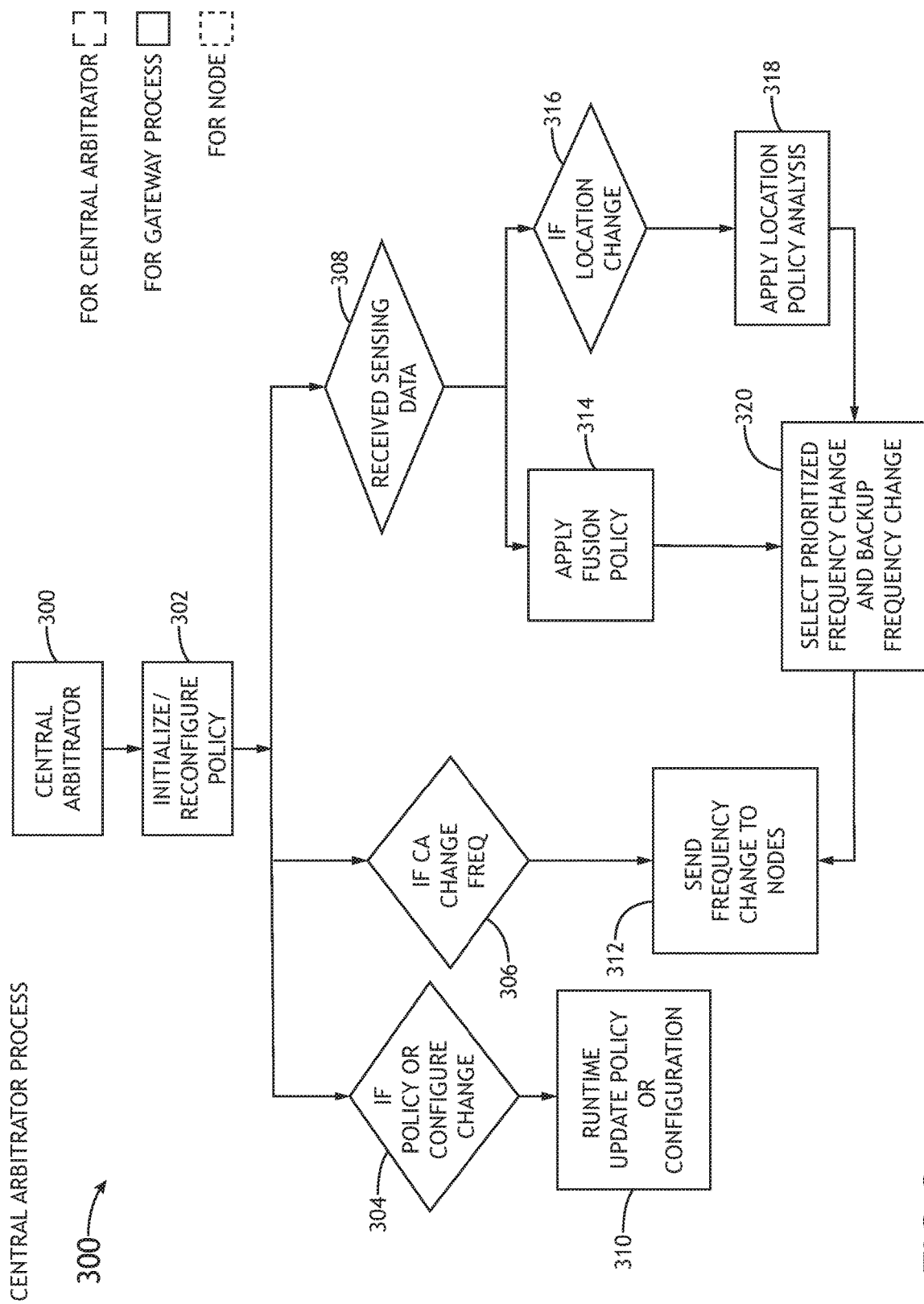
FIG. 3 shows a flowchart of a central arbitrator process for spectrum manage in a DSA architecture according to an exemplary embodiment.

Referring to FIG. 3, a flowchart of a central arbitrator process for spectrum manage in a DSA architecture according to an exemplary embodiment is shown. A central arbitrator 300 initializes (or in later iterations reconfigures) 302 a set of DSA policies, including gateway policy presets and node policy presets. The central arbitrator 300 then continuously monitors frequency data and network state data.

In at least one embodiment, the central arbitrator 300 determines 304 if there is a policy change (change to a DSA rule set) or a network configuration change, and updates 310 policies and configurations downstream by propagating policies and configuration data to each node via each node's corresponding gateway node. Updates 310 propagating up and down the hierarchy may be delta changes of previous information, minimizing control traffic volume. Likewise, if the central arbitrator 300 determines 306 that a frequency change is indicated, the new frequency is sent 312 downstream by propagating the new frequency to each node via each node's corresponding gateway node.

In at least one embodiment, the central arbitrator 300 may continuously receive 308 sensing data from any of a plurality of sources such as network nodes, gateway nodes, out-of-network sources, etc. Upon receiving 308 such data, the central arbitrator 300 applies 314 a data fusion policy to incorporate new network state and theatre state data into existing data sets; network state data and theatre state data may comprise network topology information, radio frequency sensing information, etc. Furthermore, the central arbitrator 300 may use such data to determine 316 if there is a location change associated with the data (for example, a theatre shift corresponding to a movement of the mobile nodes in the network). If so, the central arbitrator 300 applies 318 location policy analysis rules.

A selection module 320 receives the incorporated network state and theatre state data along with output of the applied location policy analysis rules to select a prioritized frequency and backup frequency, and send 312 the selected frequencies downstream by propagating the new frequency to each node via each node's corresponding gateway node. Frequencies may be gateway specific; that is to say subnets defined by a gateway may operate at different frequencies based on specific local conditions.

Figure 4:
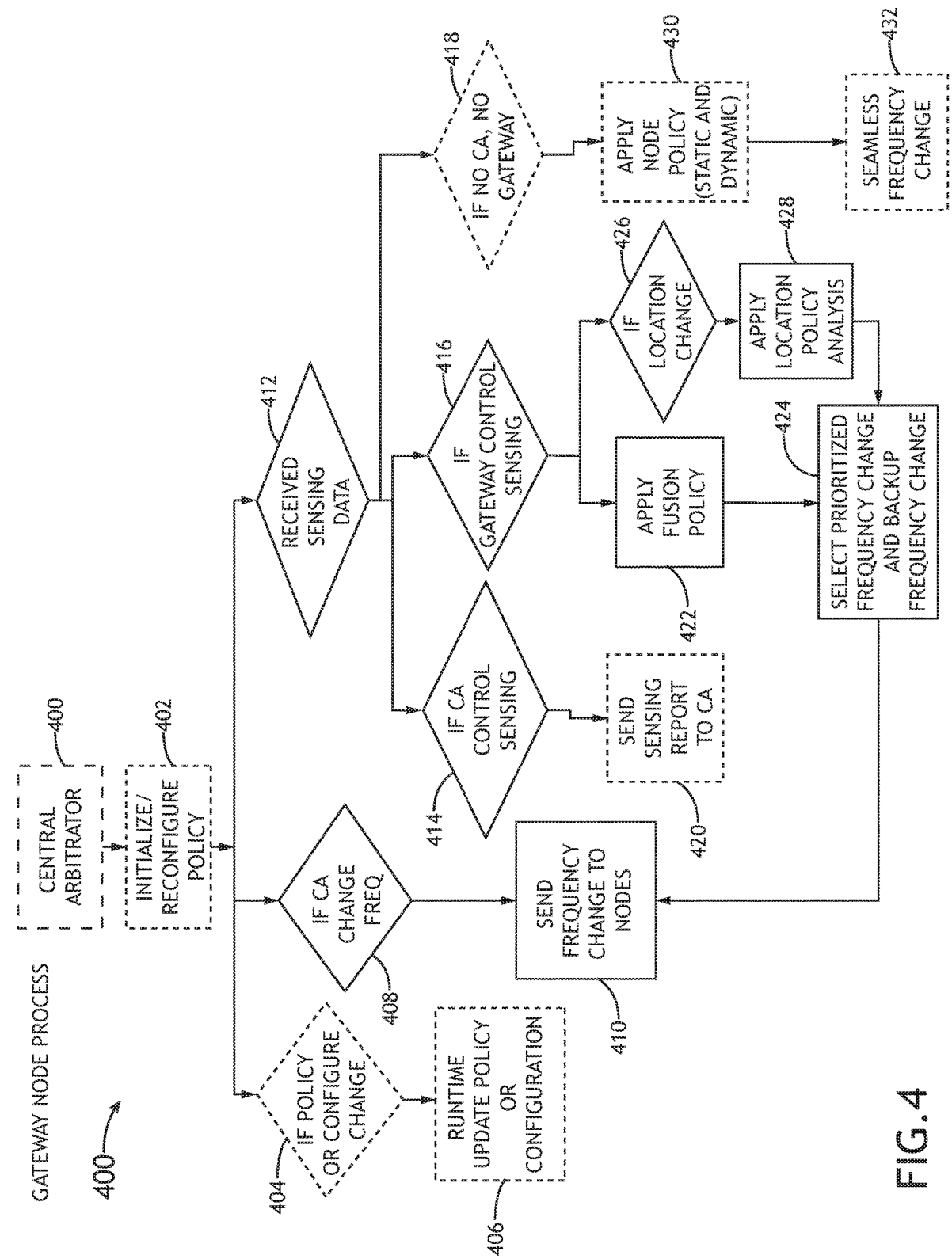
FIG. 4 shows a flowchart of a gateway node process for spectrum manage in a DSA architecture according to an exemplary embodiment.

Referring to FIG. 4, a flowchart of a gateway node process for spectrum manage in a DSA architecture according to an exemplary embodiment is shown. A central arbitrator 400 initializes (or in later iterations reconfigures) 402 a set of DSA policies. Each gateway node in the network may communicate with the central arbitrator 400 to receive one or more initial policy sets.

In at least one embodiment, the gateway node determines 404 if there is a policy change or a network configuration change, and updates 406 policies and configurations downstream to each associated node. Likewise, if the central arbitrator 400 determines 408 that a frequency change is indicated, the new frequency is received by the gateway node and sent 410 downstream to each node.

In at least one embodiment, the gateway node may continuously receive 412 sensing data from downstream nodes or the central arbitrator 400. In at least one embodiment, the central arbitrator 400 may control 414 network sensing; if so, the gateway node may periodically send 420 a network sensing report to the central arbitrator 400, the sensing report including data pertaining to the status of the network and local frequencies conditions. Alternatively, or in addition, the gateway node may control 416 sensing locally; if so, the gateway node applies 422 a data fusion policy to incorporate new network state and theatre state data into existing data sets. Furthermore, the gateway node may use such data to determine 426 if there is a location change associated with the data (for example, a theatre shift corresponding to a movement of the mobile nodes downstream from the gateway node). If so, the gateway node applies 428 location policy analysis rules.

In at least one embodiment, a selection module 424 receives the incorporated network state and theatre state data along with output of the applied location policy analysis rules to select a prioritized frequency and backup frequency for downstream nodes, and sends 410 the selected frequencies downstream to each node.

In at least one embodiment, even though a central arbitrator 400 and gateway node include policy sets for DSA, such central arbitrator 400 and gateway node may not be available 418. If so, each node downstream from the gateway node may apply 430 node specific static and/or dynamic policies. In at least one embodiment, a local cluster of nodes may negotiate the application of policies. Any node specific frequency changes are propagated to all the local nodes for seamless frequency change 432, for example by setting a switchover time based on a number of clock cycles.

Figure 5:
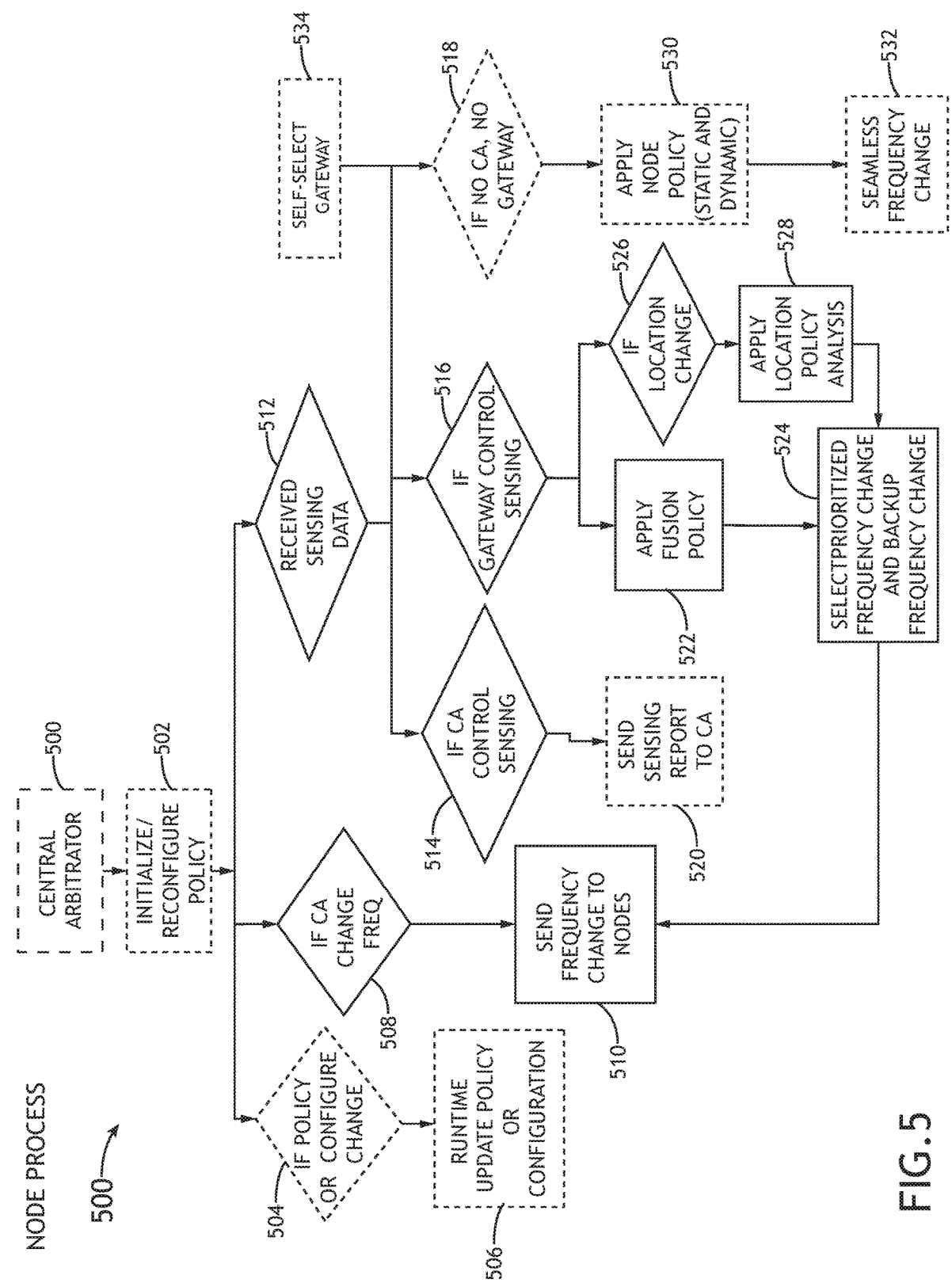
FIG. 5 shows a flowchart of a node process for spectrum manage in a DSA architecture according to an exemplary embodiment.

Referring to FIG. 5, a flowchart of a node process for spectrum manage in a DSA architecture according to an exemplary embodiment is shown. A central arbitrator 500 initializes (or in later iterations reconfigures) 502 a set of DSA policies. Each node in the network may receive one or more initial policy sets via a corresponding gateway node.

In at least one embodiment, the node determines 504 if there is a policy change or a network configuration change, and updates 506 policies and configurations; such changes may originate from a gateway node or central arbitrator 500. Likewise, if the central arbitrator 500 determines 508 that a frequency change is indicated, the new frequency is received by the node via a gateway node sending 510 such changes downstream to the node.

In at least one embodiment, the node may continuously receive 512 sensing data from a gateway node or the central arbitrator 500. In at least one embodiment, the central arbitrator 500 may control 514 network sensing; if so, the node may periodically send 520 a network sensing report to the central arbitrator 500 via a corresponding gateway node, the sensing report including data pertaining to the status of the network and local frequencies conditions. Alternatively, or in addition, a corresponding gateway node may control 516 sensing locally; if so, the gateway node applies 522 a data fusion policy to incorporate new network state and theatre state data into existing data sets. Furthermore, the gateway node may use such data to determine 526 if there is a location change associated with the data (for example, a theatre shift corresponding to a movement of the mobile nodes downstream from the gateway node). If so, the gateway node applies 528 location policy analysis rules.

In at least one embodiment, a selection module 524 receives the incorporated network state and theatre state data along with output of the applied location policy analysis rules to select a prioritized frequency and backup frequency for downstream nodes. Such selections may be sent 510 to other nodes, such as nodes in a local sub-network. The nodes in the local sub-network may negotiate a new prioritized frequency and backup frequency via cooperative DSA.

In at least one embodiment, even though a central arbitrator 500 and gateway node include policy sets for DSA, such central arbitrator 500 and gateway node may not be available 518. If so, each node may apply 530 node specific static and/or dynamic policies. In at least one embodiment, a local cluster of nodes may negotiate the application of policies. Any node specific frequency changes are propagated to all the local nodes for seamless frequency change 532, for example by setting a switchover time based on a number of clock cycles. For example; a node may empowered to make the DSA decision to search backup frequencies in order to establish connectivity with peer nodes when the node loses contact to its peer nodes and becomes an orphan node.

In at least one embodiment, each node may include a self-select process 534 configured to convert the node into a gateway node according to a set of criteria. Such self-select process 534 may apply a gateway specific DSA process (such as set forth in FIG. 4).

Figure 6:
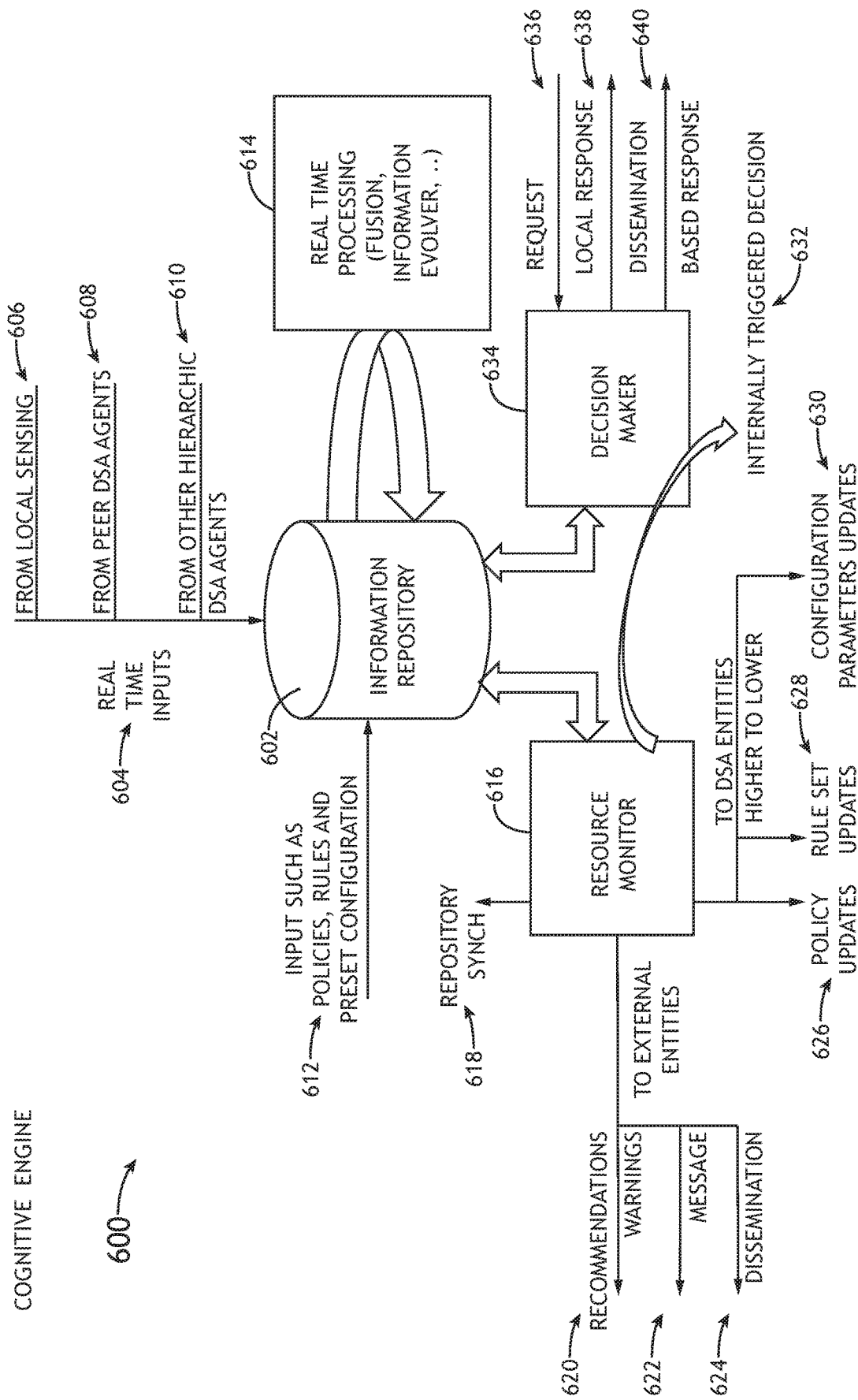
FIG. 6 shows a block diagram of a cognitive engine according to an exemplary embodiment.

Referring to FIG. 6, a block diagram of a cognitive engine 600 according to an exemplary embodiment is shown. In at least one embodiment, each node in a network includes a cognitive engine 600 configured for DSA. The cognitive engine 600 includes an information repository 602, an information fusion process 614, a resource monitoring process 616, and a decision-making process 634.

In at least one embodiment, the information repository 602 receives real-time inputs 604 from local sensors 606, peer node agents 608 (peer node cognitive engines 600), and other hierarchical sources 610 such as gateway nodes if the cognitive engine 600 is embodied in a node or a central arbitrator if the cognitive engine is embodied in a node or gateway node; each data point may be tagged with a GPS derived location, and an altitude when applicable, to correlate each data point within the environment. Furthermore, the information repository 602 may also receive policies, rules, and configurations 612 from a central arbitrator and/or a gateway node. Such policies, rules, and configurations 612 are likely to be periodic or situational, rather than continuous and real-time.

In at least one embodiment, the real-time inputs 604 are processed via the information fusion process 614. The information fusion process 614 correlates the real-time inputs 604 to existing data in the information repository 602 to replace outdated data or include new data points such as regions of increased interference in a frequency band. Furthermore, the information fusion process 614 may identify real-time inputs 604 that are out-of-date as compared to existing data in the information repository 602, or that conflicts with contemporaneous data in the information repository 602.

In at least one embodiment, the resource monitoring process 616 may send repository synchronization information 618 to other nodes in the network, generally corresponding to new data generated or sensed by the node and/or the identified out-of-date real-time inputs, or conflicting inputs. The resource monitory process 616 sends warnings and recommendations 620, messages 622, and sensed data for dissemination 624 to other nodes or downstream nodes.

Furthermore, in at least one embodiment, the resource monitoring process 616 sends policy updates 626, rule set updates 628, and/or updated configuration parameters 630 to other nodes and/or a central arbitrator whenever the cognitive engine 600 makes such updates 626, 628, 630. In at least one embodiment, the resource monitoring process 616 may trigger the decision-making process 634 to execute certain DSA decisions 632.

In at least one embodiment, the decision-making process 634 may receive requests 636 for a DSA decision, such as from a peer node attempting to implement a cooperative decision-making process such as by voting, or from a node to a gateway node. The decision-making process 634 may produce a local response 638 based on an application of policies, rules, and configurations 612 to theatre and network data in the information repository 602. Alternatively, or in addition, the decision-making process 634 may disseminate a received response 640 from a cognitive engine 600 of an entity having a higher hierarchical status, such as gateway node or a central arbitrator. In either case, the response 638, 640 is send to peer entities, downstream entities, and synchronized with upstream entities.

Figure 7:
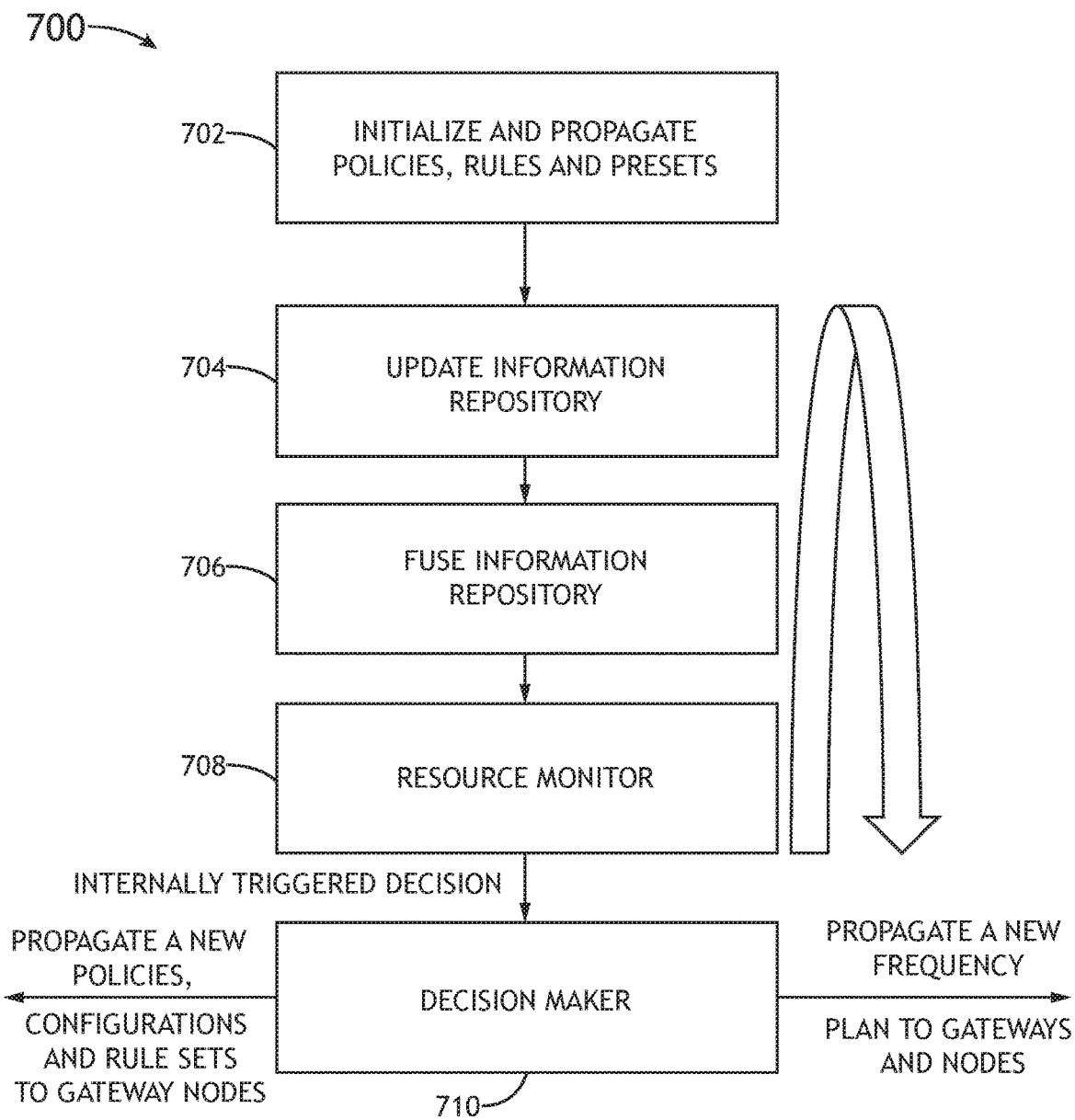
FIG. 7 shows a block diagram of a central arbitrator cognitive engine thread according to an exemplary embodiment.

Referring to FIG. 7, a block diagram 700 of a central arbitrator cognitive engine thread 700 according to an exemplary embodiment is shown. In a cognitive engine executing on a central arbitrator, an initialization process establishes DSA policies, rules, and presets, and propagates those policies, rules, and presents to gateway nodes in the network; the gateway nodes further propagate the policies, rules, and presents to downstream nodes. The central arbitrator cognitive engine then enters a loop of updating 704 information in an information repository based on data about the network and operating theatre received from sensing hardware within the central arbitrator, sensing hardware within the mobile platforms that comprise the mobile network, and outside sources in data communication with the central arbitrator but not within the network. After information is updated, the cognitive engine fuses 706 the information and an active resource monitor 708 triggers decisions based on policies and DSA rule sets. Based on the applicable policies and DSA rules, a decision maker 710 may either re-plane the theatre frequency assignment or update the policies and rule sets. In at least one embodiment, the updating, fusing, and monitor loop, and decision-making processes, may be totally autonomous. Alternatively, the active resource monitor 708 may make recommendations to human-in-the-loop and accept and implement decisions from the human-in-the-loop to accept or reject frequency change recommendations.

Figure 8:
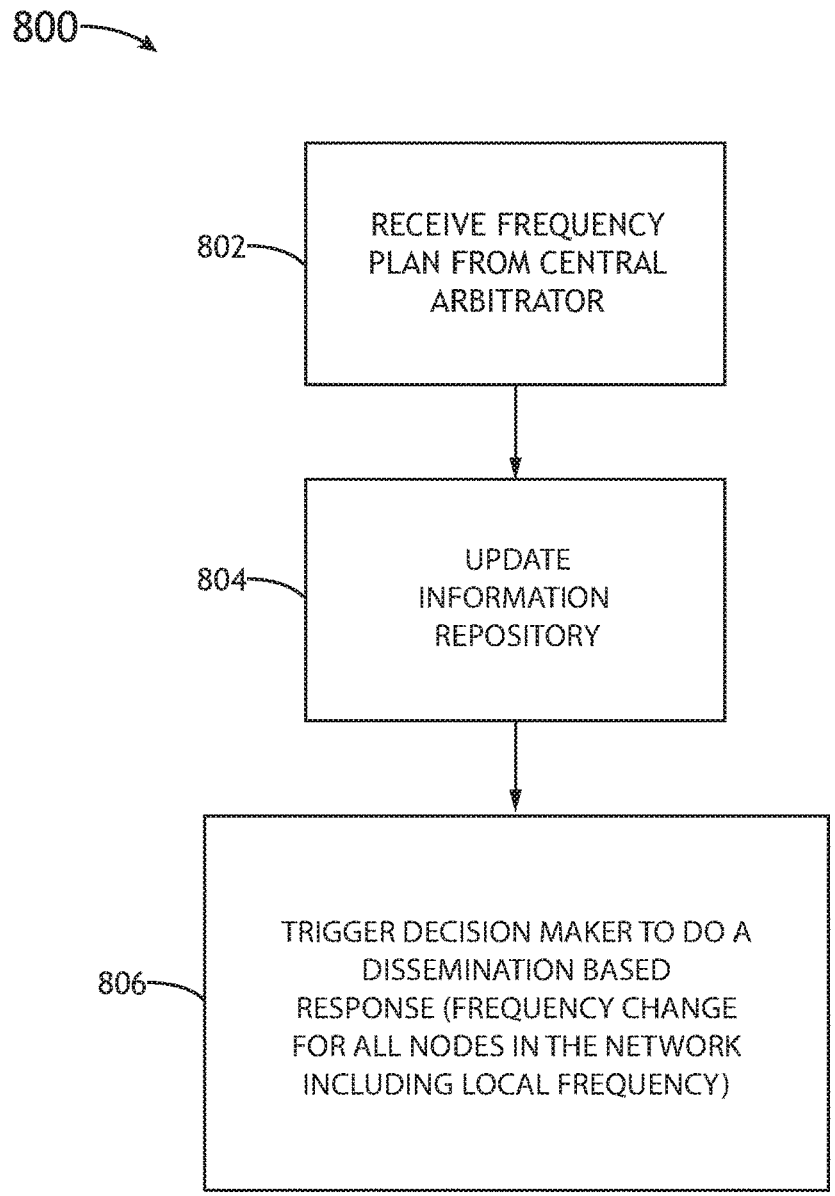
FIG. 8 shows a block diagram of a gateway node thread for frequency change according to an exemplary embodiment.

Referring to FIG. 8, a block diagram of a gateway node thread 800 for frequency change according to an exemplary embodiment is shown. In at least one embodiment, a cognitive engine embodied in a gateway node receives 802 a frequency change plan from a central arbitrator and propagates the plan to all downstream nodes. The gateway node may periodically receive 804 updated information (for example, updated policies or rule sets). The updated information is fused to update an information repository. Decisions may be triggered 806 to propagate new policies and rule sets to downstream nodes. Such decisions may be based on the policies and rule sets as applied to a current state of the network or operating theatre.

Figure 9:
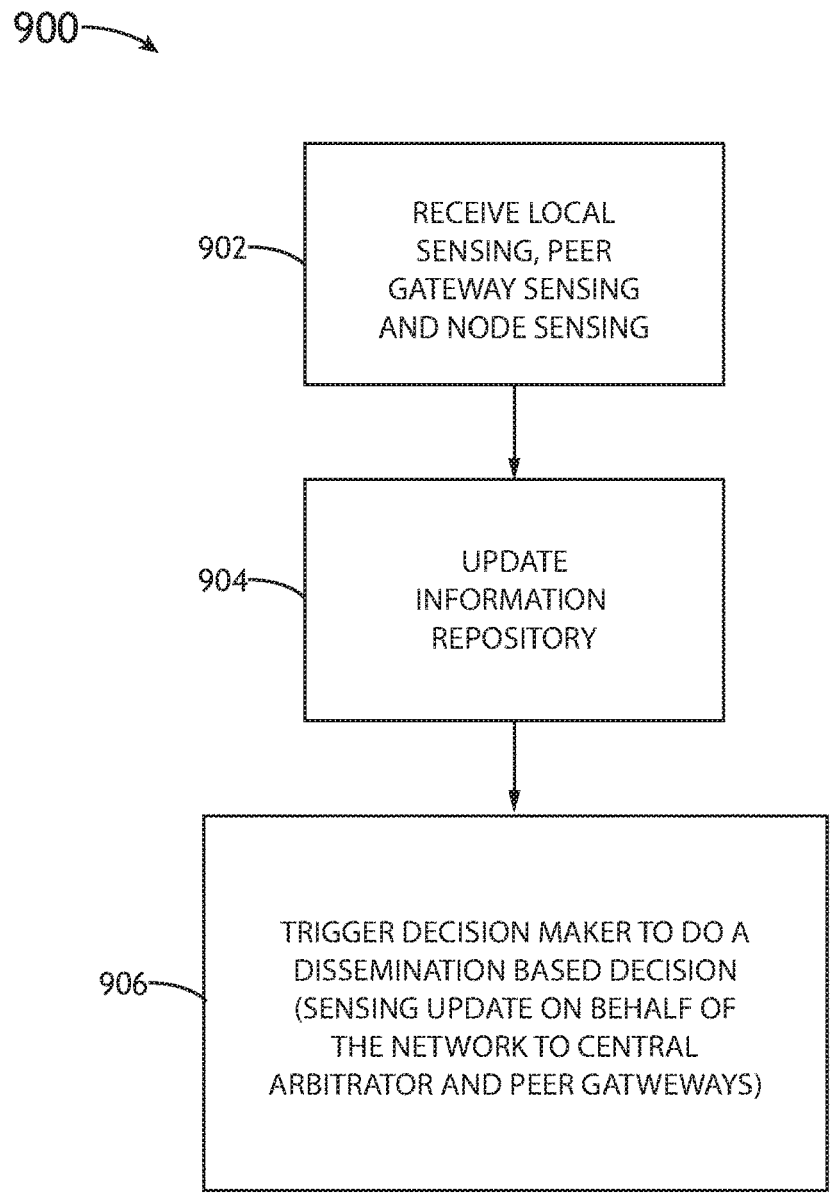
FIG. 9 shows a block diagram of a gateway node propagation process thread according to an exemplary embodiment.

Referring to FIG. 9, a block diagram of a gateway node propagation process thread 900 according to an exemplary embodiment. The gateway node receives 902 local state data from connected sensors and from downstream nodes, and state data from peer gateway nodes. A local gateway node information repository is updated 904 with the received 902 state data, and a decision-making process is triggered 906. In at least one embodiment, the decision-making process may determine, based on a set of policies and rule sets, a dissemination-based decision is appropriate. A sensing update is applied, by the gateway node, on behalf of a central arbitrator and peer gateways such that the consolidated or fused data is disseminated to the peer gateway nodes and the central arbitrator for inclusion in corresponding information repositories.

In at least one embodiment, the flowchart 900 may be embodied in a cognitive engine where the information repository is continually updated 904 and information is fused. A resource monitor may independently trigger 906 recommendations, warnings, or information dissemination to external entities as one category of the outcome. Decision making may be based on a request from peer gateway nodes or downstream nodes, or it can be internally triggered 906.

Spectrum management policies may be static (defined by an initial set of policies) or dynamic (runtime changeable). Furthermore, spectrum management policies may be specific to the level of the decision maker (node, gateway, or central arbitrator). Static policies may include frequency exclusion rules and/or regional exclusion rules. Dynamic policies may include location-based rules and/or sensing related rules defined at a central arbitrator level, and at a gateway node level. Location based rules may be based on location reuse, location interference, and/or external interference. Sensing related rules may be based on identified interference and/or prioritized frequencies and backup frequencies. In at least one embodiment, dynamic policies may include location-based rules defined at the node level.

In at least one embodiment, dynamic policies are stored in locally in each network element. The central arbitrator sets and disseminates static policies and default dynamic policies to each gateway node (and downstream to non-gateway nodes). Each gateway node stores the static policies and default gateway node policies; non-gateway nodes store the static policies and default gateway node policies because any node may become a gateway node. The policies and network initial setup may be understood with reference to the following table.

|  | Policy | Central Arbitrator | Gateway Node | Network Node | Over the Air Update |
|---|---|---|---|---|---|
| Static | Frequency Exclusion | Mission Plan | Preset | Preset | NA |
|  | Regional Exclusion | Mission Plan | Preset | Preset | NA |
| Dynamic | Central Arbitrator Location Based | Default in Mission Plan | NA | NA | NA |
|  | Central Arbitrator Sensing Data Related | Default in Mission Plan | NA | NA | NA |
|  | Gateway Node Location Based | Default in Mission Plan | Default in Preset | Default in Preset | Yes |
|  | Gateway Node sensing Data related | Default in Mission Plan | Default in Preset | Default in Preset | Yes |
|  | Network Node Location Based | Default in Mission Plan | Default in Preset | Default in Preset | Yes |

There is a broad array of possibilities when implementing dynamic spectrum management, including solving spectrum conflicts with another system using the same frequency, solving spectrum conflicts between different MANETs in the same system, and avoiding jammers that can intentionally render a frequency unusable. With systems such as military networks, a central arbitrator has the advantage of obtaining a global view of the theater. However, the central arbitrator is then a single point of failure. Spectrum sensing information must be fused and abstracted at different hierarchical levels which creates a large volume of control traffic that may cost significant throughput. Dynamic spectrum management that is autonomous at different hierarchical levels is desirable and requires spectrum sensing information being fused and going up the hierarchical network to the central arbitrator as well as policies and automation rules from the central arbitrator being propagated down to the autonomous decision-making points of the hierarchical networks. Level specific policies may define the scope of DSA decisions a network node can make autonomously; other DSA decisions that elected gateway nodes can make autonomously on behalf of the network or on behalf of a single node in the network; a distributed cooperative technique between a single network nodes that can make other DSA cooperative decisions autonomously; a distributed cooperative technique between network gateways that can make other DSA decisions; and ability of the central arbitrator to make other DSA decisions on behalf of the entire theater, on behalf of a single sub-network, or on behalf of a single node.

Hierarchical decisions require spectrum sensing information be fused and propagated to peer entities and to higher hierarchical entities. Fusion can occur at the node level and can be propagated to peer nodes and to gateway nodes. Fusion can also be performed at the gateway level to be propagated to peer network gateways or to the central arbitrator. Fusion can happen at the central arbitrator to generate decisions and rules for autonomous decisions at different hierarchical levels of the network. These rules can propagate down such that if a gateway can't reach the central arbitrator, it can make a DSA decision through distributed cooperative techniques with other gateway nodes or by relying on a most recent rule set and policies received from the central arbitrator. If the same gateway node can't reach peer gateway nodes, that gateway is still able to make autonomous DSA decisions for its network. Similarly, if a node can defer a DSA decision to the network gateway, it will follow a decision received from the gateway, however if the same node can't reach the gateway, it can rely on distributed cooperative techniques with peer nodes. If it can't make cooperative distributive decisions with peer nodes it can autonomously make a DSA decision.

Furthermore, a network utilizing the disclosed methods may provide optimal DSA decision making based on real-time conditions, including approval and disapproval of switching frequency, coordination and collaboration between network nodes for a DSA decision that is optimal to the network, coordination and collaboration between gateway nodes to make a decision that is optimal for a network of networks, and DSA decisions made by the central arbitrator to optimize frequency use for the entire theater. These schemes may also provide a streamlined representation-based coordination of DSA decision making for reducing potential conflicts in making DSA decisions at the different hierarchical levels or the different distributed cooperative levels.

If an entity can reach the higher hierarchy entity for a DSA decision, the higher hierarchy entity decision will have precedence over the entity's own decision. For example, a gateway decision has presence over a node decision and the central arbitrator decisions have precedence over a gateway decision. When the control plan condition deteriorates, an entity can rely on its local decision-making capability. Once a control plane condition is improved, rule set updates may be synchronized between different DSA decision making entities with reference to a higher hierarchical entity for DSA decision making.

DSA cloud services decisions can have different levels of precedence. For example, a decision made by the central arbitrator would have precedence over all other decisions. A decision made through cooperative distributed techniques between gateway nodes will have second precedence and only the central arbitrator can override this decision. This distributed cooperative gateway decisions will have precedence over a single gateway decision and will have precedence over all node decisions. A gateway decision for a network can be considered a proxy of the central arbitrator decision with respect to the gateway local network. This gateway decision in its own network will have precedence over network node decisions but can be overridden by cooperative distributed decisions between gateway nodes and can be overridden by the central arbitrator decision. The next level of hierarchical decision is cooperative decisions between network nodes that are not able to reach the gateway node. These decisions have precedence only over the local node decision.

In at least one embodiment, DSA decision making may be considered a cloud computing service that needs to propagate to the network edges for seamless autonomous decisions of spectrum use regardless of how the wireless communications links are performing. DSA decisions tend to be needed when the networks are performing poorly due to interference and reaching a centralized DSA arbitrator is not guaranteed.

In at least one embodiment, a DSA cloud service, which may be cloud-based or substantially cloud-based, creates a frame for optimization of DSA decision making. The DSA service is pushed to the lowest hierarchical entities, not relying on a specific client/server interaction. The server of DSA services can be any entity in the network, even down to the network nodes.

In at least one embodiment, the system produces hierarchical spectrum information fusion points and propagates the fused spectrum sensing information to create spectrum awareness at the different network hierarchical points.

In at least one embodiment, policy automation rules based on the spectrum situation awareness are entered at the central arbitrator and propagated down to the lower hierarchical points.

In at least one embodiment, DSA decisions may be made in varied response time. For example, node-based decisions can be made faster than network-based decisions, and network-based decisions can be made faster than theater-based decisions.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A mobile ad-hoc network comprising:
at least one central arbitrator configured to define a preset gateway node dynamic rule set and a preset network node dynamic rule set;
at least one gateway node in data communication with the at least one central arbitrator and with any other of the at least one gateway nodes; and
at least one network node in data communication with the at least one gateway node and with any other of the at least one network nodes,
wherein:
the central arbitrator is configured to:
receive network information and theatre information from a plurality of sources, the network information and theatre information comprising at least network topology information and radio frequency sensing information;
fuse the network information and theatre information with existing information in an information repository; and
propagate the fused information to downstream nodes; and
the at least one gateway node is configured to:
receive network information and theatre information from a plurality of sources;
receive arbitrator fused information from the central arbitrator;
fuse the network information, theatre information, and arbitrator fused information with existing information in an information repository; and
propagate the fused information to downstream nodes.

2. The network of claim 1, wherein the at least one gateway node is further configured to:
identify a frequency conflict;
determine that the at least one central arbitrator is not reachable;
determine a frequency change;
propagate the frequency change to downstream nodes; and
update the gateway node dynamic rule set.

3. The network of claim 2, wherein the at least one gateway node is further configured to:
determine that the at least one central arbitrator is reachable after the frequency change via periodic attempted communication on a previous frequency or the changed frequency;
update the at least one central arbitrator of the frequency change; and
receive an approval of the frequency change.

4. The network of claim 2, wherein the at least one gateway node is further configured to set a switchover time for the frequency change based on a prospective duration to propagate the frequency change.

5. The network of claim 1, wherein the at least one network node is further configured to:
identify a frequency conflict;
determine that a corresponding gateway node is not reachable;
determine a frequency change;
propagate the frequency change to peer network nodes; and
update the gateway node dynamic rule set.

6. The network of claim 5, wherein the at least one network node is further configured to:

determine that the gateway node is reachable after the frequency change via periodic attempted communication on a previous frequency or the changed frequency;

update the corresponding gateway node of the frequency change; and receive an approval of the frequency change.

7. The network of claim 5, wherein the at least one network node is further configured to:

determine via data communication with peer nodes that the network node be converted to a gateway node; and implement the gateway node dynamic rule set.

8. A node in a mobile ad-hoc network comprising:

a cognitive engine comprising:

an information repository;

a decision-making process; and a resource monitoring process, wherein:

cognitive engine is configured to store a gateway node dynamic rule set and a network node dynamic rule set in the information repository;

the resource monitor is configured to:

receive network information and theatre information from a plurality of sources, the network information and theatre information comprising at least network topology information and radio frequency sensing information;

fuse the network information and theatre information with existing information in the information repository; and propagate the fused information to nodes in the mobile-ad-hoc network.

9. The node of claim 1, wherein:

the node is a gateway node;

the resource monitoring process is configured to:

identify a frequency conflict; and trigger the decision-making process; and the decision-making process is configured to:

determine a frequency change based on the gateway node dynamic rule set;

propagate the frequency change to downstream nodes; and update the gateway node dynamic rule set.

10. The node of claim 9, wherein:

the resource monitoring process is further configured to:

determine that a central arbitrator is reachable after the frequency change via periodic attempted communication on a previous frequency or the changed frequency;

update the central arbitrator of the frequency change; and receive an approval of the frequency change.

11. The node of claim 9, wherein the decision-making process is further configured to set a switchover time for the frequency change based on a prospective duration to propagate the frequency change.

12. The node of claim 9, wherein:

the decision-making process is configured to:

receive a request for a decision from a downstream node.

13. The node of claim 8, wherein:

the node is a network node;

the resource monitoring process is further configured to:

identify a frequency conflict;

determine that a corresponding gateway node is not reachable;

trigger the decision-making process; and the decision-making process is configured to:

determine a frequency change based on the network node dynamic rule set;

propagate the frequency change to peer network nodes; and update the gateway node dynamic rule set.

14. The node of claim 13, wherein the decision-making process is further configured to:

send a request for a decision to peer network nodes; and apply a cooperative decision-making policy via data communication with the peer network nodes.

15. The node of claim 13, wherein the decision-making process is further configured to:

determine via data communication with peer nodes that the network node be converted to a gateway node; and implement the gateway node dynamic rule set.

* * * * *